United States Patent [19]
Seol

[11] Patent Number: 5,088,340
[45] Date of Patent: Feb. 18, 1992

[54] MULTIPURPOSE TRANSMISSION MECHANISM FOR BICYCLES

[76] Inventor: Marn T. Seol, No. 4-1, Lane 312, Min Chen Road, Shi Chiu, Taichung, Taiwan

[21] Appl. No.: 675,812

[22] Filed: Mar. 27, 1991

[51] Int. Cl.$^5$ .............................................. F16H 27/02
[52] U.S. Cl. ........................................ 74/143; 280/253
[58] Field of Search ........................... 74/143; 280/253

[56] References Cited

U.S. PATENT DOCUMENTS

| | | | |
|---|---|---|---|
| 600,450 | 3/1898 | Richmond | 74/143 |
| 608,008 | 7/1898 | Schneidewind | 74/143 |
| 2,391,809 | 12/1945 | Wasem | 280/253 |
| 4,564,206 | 1/1986 | Lenhardt | 280/253 X |

FOREIGN PATENT DOCUMENTS

| | | | |
|---|---|---|---|
| 152590 | 2/1938 | Austria | 74/143 |
| 465448 | 5/1950 | Canada | 74/143 |

*Primary Examiner*—Leslie A. Braun
*Assistant Examiner*—Ryan W. Massey

*Attorney, Agent, or Firm*—Fleit, Jacobson, Cohn, Price, Holman & Stern

[57] ABSTRACT

A multipurpose transmission mechanism for bicycles, including a pair of one-way cranks, a control mechanism, a reciprocating mechanism, and a fixed lock wheel and a chain wheel holder. By means of the control of control levers, the movable lock wheels of the control mechanism are moved to couple with the alternative wheels of the reciprocating mechanism permitting the cranks to perform reciprocating lever motion, to couple with the fixed lock wheel and the chain wheel holder permitting the cranks to perform circular crank motion, or to disengage from the alternative wheels, the fixed lock wheel as well as the chain wheel holder permitting the cranks to be (1) simultaneously driven to rotate synchronously, (2) simultaneously driven to perform reciprocating lever motion, (3) respectively driven to rotate alternatively (4) alternatively driven to perform reciprocating lever motion, (5) one driven to perform circular crank motion and the other kept standing still, or (6) one driven to perform reciprocating lever motion and the other kept standing still.

1 Claim, 3 Drawing Sheets

MULTIPURPOSE TRANSMISSION MECHANISM FOR BICYCLES

BACKGROUND OF THE INVENTION

The present invention relates to transmission mechanisms for bicycles and relates more particularly to a multipurpose transmission mechanism for a bicycle which can be controlled to propel a bicycle or the like by foot pedals through crank or lever transmission or, alternatively through crank and lever transmission.

In regular bicycles, tricycles or stationary bicycles, power transmission is generally made through rotary type of crank motion or reciprocating type of lever motion (as disclosed in U.S. Pat. No. 4,575,649). In crank-driven type of power transmission mechanism, it requires much labor to drive the crank to pass through the dead angle (when the pedal of the crank is to be rotated from an upper limit position toward a lower limit position). Further, driving foot pedals to carry cranks to alternatively perform circular motion is quite monotonous and uninteresting. In lever motion type of power transmission mechanism, there is no dead angle within the cycle of lever motion and, the stroke of the pedals can be freely adjusted. Although it is adjustable, loss of inertia force at the upper as well as the lower changing point is inevitable.

SUMMARY OF THE INVENTION

The present invention has been accomplished under the circumstances in view. It is therefore the main object of the present invention to provide a power transmission mechanism for bicycles which can be controlled through a control handle to propel a bicycle through crank transmission, lever transmission or alternatively through crank and lever transmission.

According to the present invention, power transmission can be made through either of the following three ways:

1. Lever transmission: Foot pedals are alternatively driven to perform reciprocating motion and, the range of the stroke is adjustable. Because of no dead angle, this power transmission method is relatively labor saving.
2. Crank transmission: This method is more suitable for accelerating the speed.
3. Lever and crank alternative transmission: Foot pedals can be separately operated, i.e. two foot pedals can be synchronously as well as alternatively driven to perform circular motion or lever motion, either foot pedal can be independently driven to perform circular or lever motion.

DETAILED DESCRIPTION OF THE PREFERRED EMBODIMENT

Figure 1:
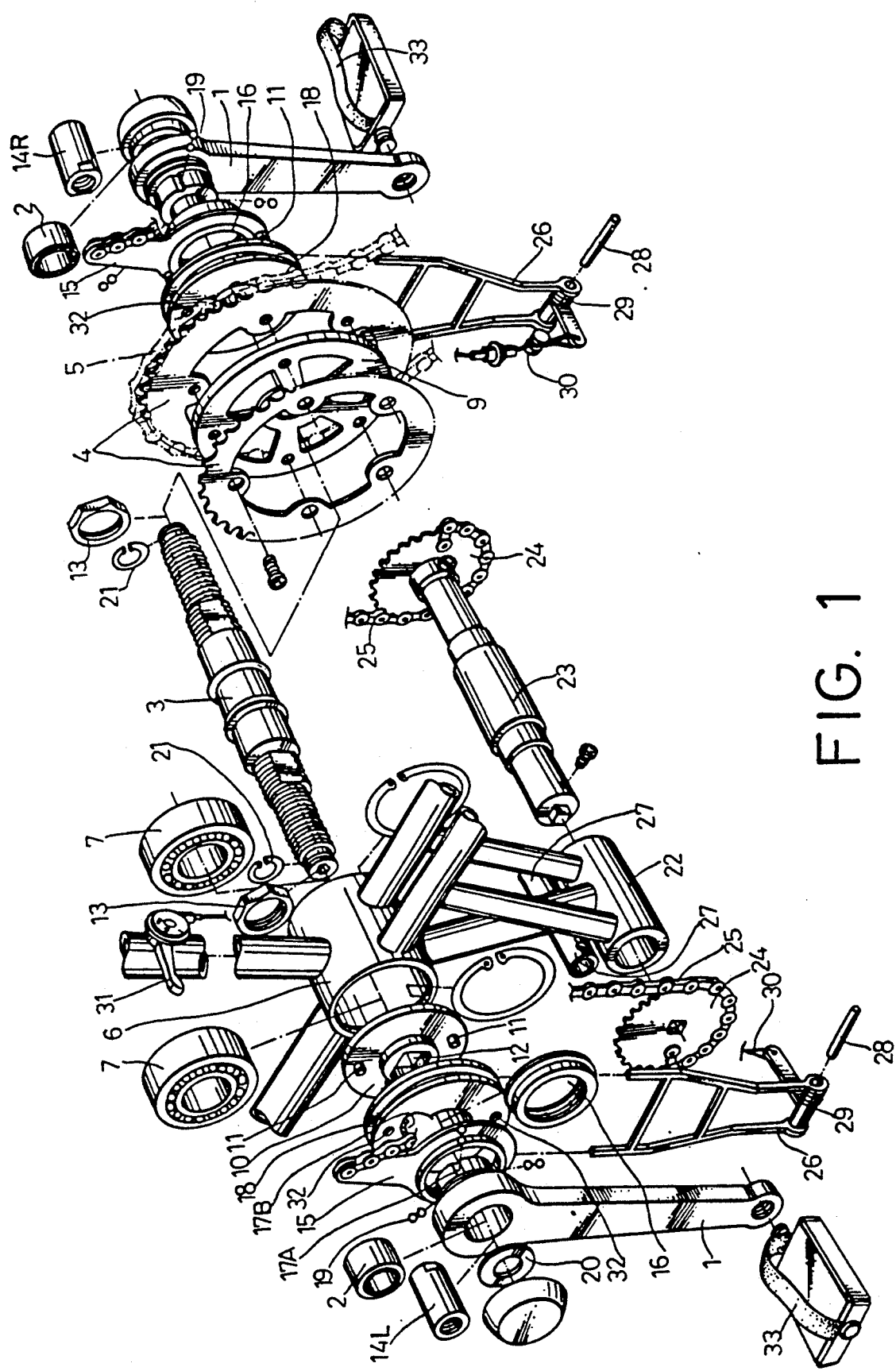
FIG. 1 is a dismantled perspective view of the preferred embodiment of the transmission mechanism of the present invention.
Figure 2:
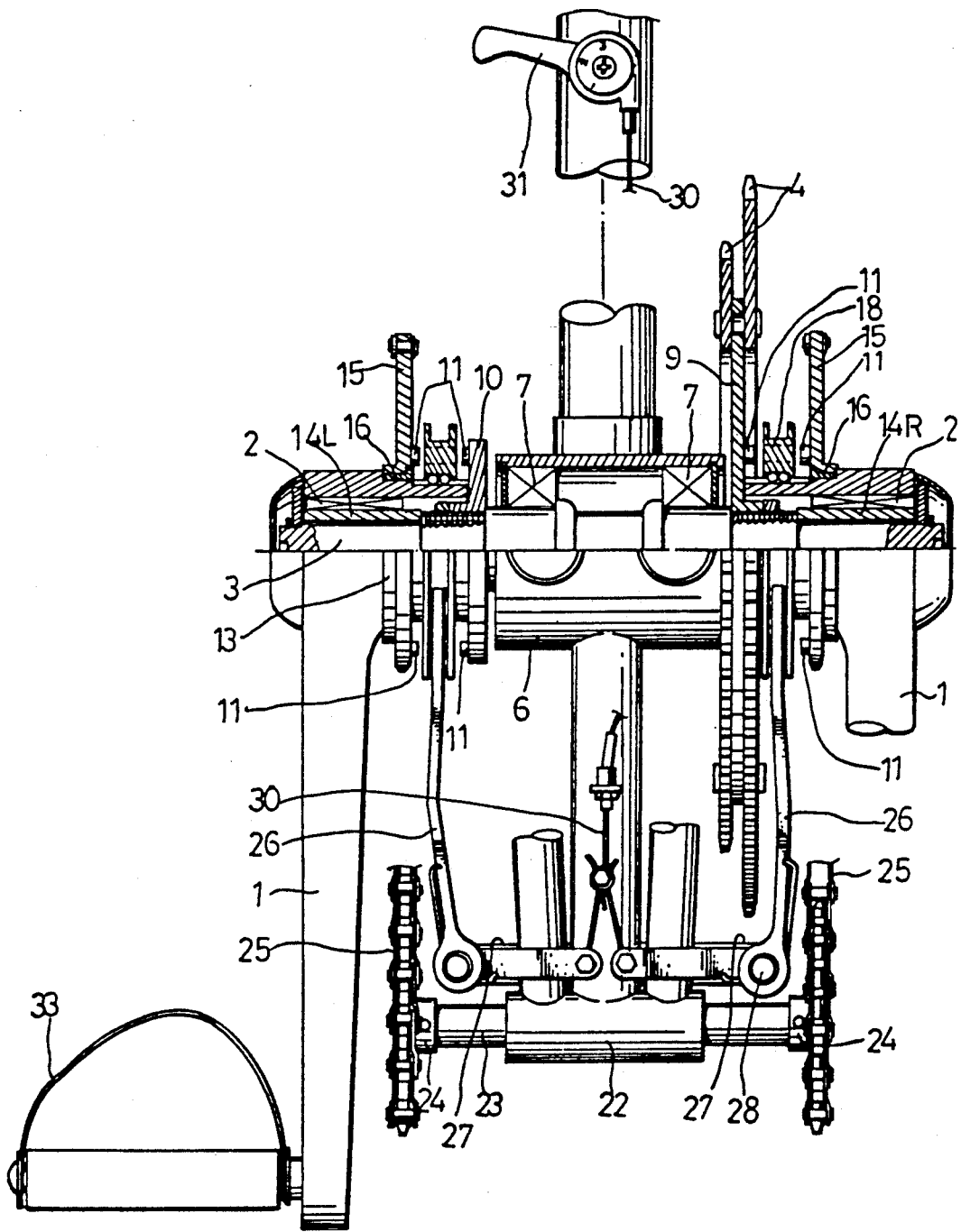
FIG. 2 is a sectional assembly view thereof.
Figure 3:
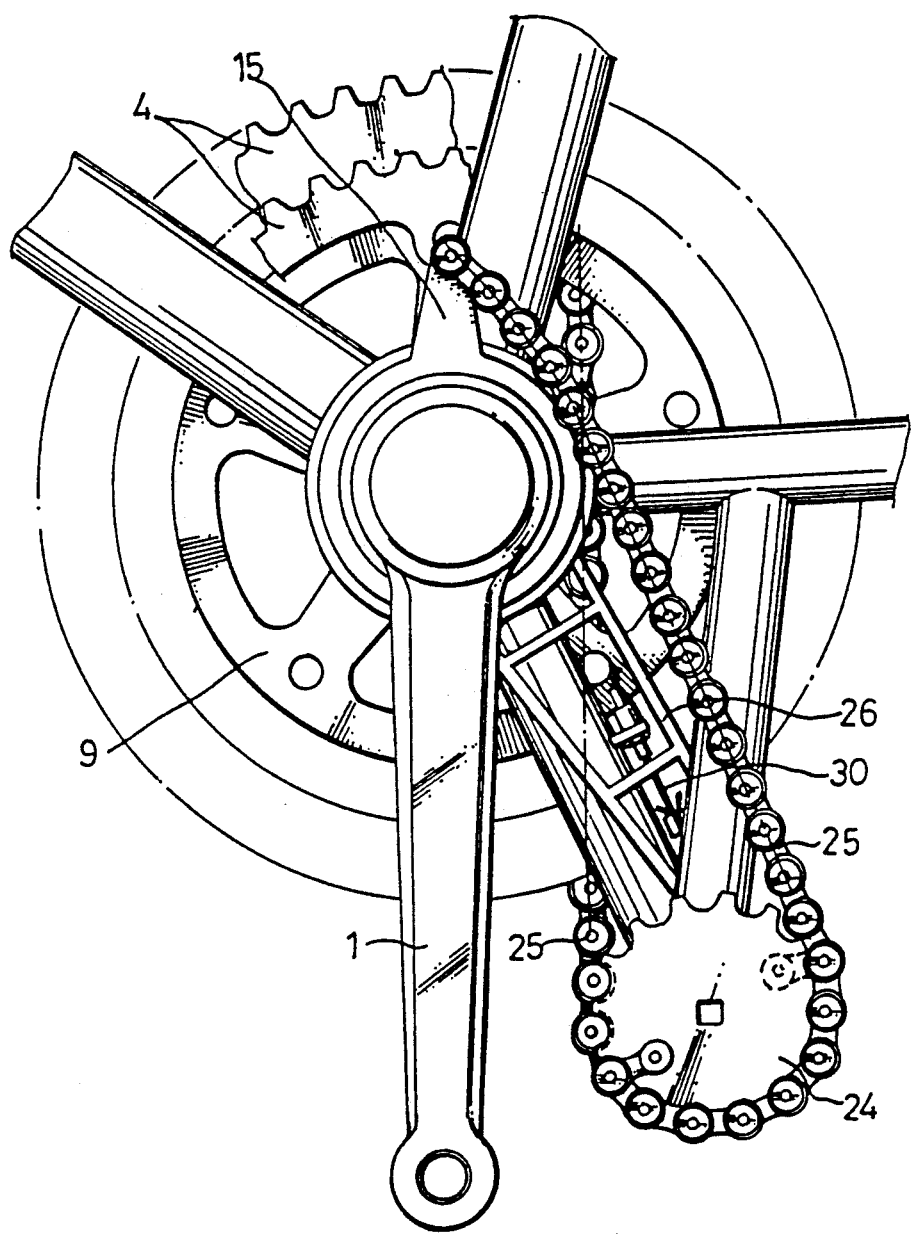
FIG. 3 is a side view taken on FIG. 2.

Referring to the annexed drawings in greater detail, the main difference between the present invention and regular crank-driven or lever-driven transmission mechanism is that a clutch bearing 2 is inserted in each crank 1 such that the bottom bracket bearing axle 3 can only be driven by the crank 1 to drive the chain wheel 4 to carry the free-wheel hub (not shown) to rotate in one direction via the bushed chain 5.

Referring to the annexed drawings again, the bottom bracket bearing axle 3 is transversely disposed to freely rotate in the bottom bracket bearing 7 which is fastened in the bottom bracket 6 of a bicycle. The chain wheel 4 is attached to a chain wheel holder 9 and mounted on the bottom bracket bearing axle 3 at one end and driven by the bushed chain 5 to carry the free wheel of said bicycle to rotate (same as in regular bicycles). A fixed lock wheel 10 is mounted on the bottom bracket bearing axle 3 at an opposite end. The chain wheel holder 9 and the fixed lock wheel 10 have each a plurality of stub rods 11 at an outer side and respectively firmly secured to the bottom bracket bearing axle 3 at the two opposite sides of the bottom bracket 6 by means of a square hole 12 which is made on the fixed lock wheel 10 at the center and a lock nut 13. By means of a left-handed female screw 14L and a right-handed female screw 14R, the bottom bracket bearing axle 3 is firmly retained in the bottom bracket 6.

Since a clutch bearing 2 each is mounted between the bottom bracket bearing axle 3 and each crank 1 (either the one at the left side or the other at the right side), the bottom bracket bearing axle 3 are driven to rotate only when the two cranks 1 of the bicycle are simultaneously rotated in a specific direction. A bushing 16 is mounted on each crank 1 to secure an alternative wheel 15 each thereto permitting said alternative wheel 15 to freely rotate on the corresponding crank 1. Similar to the fixed lock wheel 10 and the chain wheel holder 9, the alternative wheel 15 also has a plurality of stub rods 11 on the face thereof. Each crank 1 has a plurality of semi-circular grooves 17A longitudinally made on the outer wall surface thereon at one end. A movable lock wheel 18 each is respectively mounted on each crank 1. The movable lock wheel 18 has a plurality of semi-circular grooves 17B on the inner wall of the wheel hub thereof respectively disposed to match with the semi-circular grooves 17A on each crank 1 for holding a plurality of steel balls 19 therebetween. Because of the effect of the steel balls 19, the movable lock wheel 18 is prohibited from rotary motion but can only be moved to slide horizontally. The movable lock wheel 18 has a plurality of locking holes 32 respectively made at locations corresponding to the stub rods 11 of the alternative wheel 15, the chain wheel holder 9 and the fixed lock wheel 10. After the aforesaid parts are respectively mounted on the two outer thread portions 14 at the two opposite ends of the bottom bracket bearing axle 3, a washer 20 and a C-shaped retainer ring 21 each are respectively mounted on either end of the bottom bracket bearing axle 3 to secure the aforesaid parts in position.

There is provided an auxiliary bracket 22 made at the bottom of the bottom bracket 6 for holding an auxiliary axle 23 which has two auxiliary chain wheels 24 respectively mounted thereon at the two opposite ends thereof. Two chain lines 25 in well measured length are respectively connected between the two chain wheels 24 and the alternative wheels 15. When viewing from one side, the two chain lines 25 have each two opposite ends respectively fixedly connected to the auxiliary chain wheel and the alternative wheel at either side and, are respectively crossed over each other. Therefore, when the alternative wheel 15 at one side is driven by one auxiliary chain wheel and the connected chain line to rotate in clockwise direction, the alternative wheel 15 at the other side is driven by the other auxiliary chain wheel and chain line to rotate in counter-clockwise direction, and vice versa.

There are provided two control crank brackets 27 at the top of the auxiliary bracket 22 below the bottom bracket 6 for mounting two control cranks 26 at two opposite sides by a pivot 28 each, which two control cranks 26 have each an upper end respectively attached to the movable lock wheels 18. Two double-helical springs 29 are respectively mounted on the two control cranks 26, having each two opposite ends respectively stopped against the control cranks 26 and the control crank brackets 27. Because of the double-helical springs 29, the upper end of the control cranks 26 are constantly respectively forced to incline inwards (toward each other). Therefore, the two control cranks 26 can be controlled to drive the movable lock wheels 18 to displace horizontally. The control cranks 26 have each a terminal end connected to a control lever 31 through a steel wire 30 respectively, which control lever 31 is mounted the handlebar of the bicycle at either end to control the position of the corresponding movable lock wheel 18. By means of the control lever 31, the top end of the corresponding control crank 26 can be pulled by the corresponding steel wire 31 to extend outwards. When the control lever 31 is released, the corresponding double-helical spring 29 immediately forces the corresponding control crank 26 to incline inwards again. Therefore, through the aforesaid operation, the movable lock wheels 18 are controlled to displace rightwards or leftwards on the bottom bracket bearing axle 3.

When the two control levers 31 at two opposite ends are respectively adjusted to position (1), the connected two steel wires 30 are respectively pulled up to drive the two control cranks 26 to respectively extend outwards, permitting the two movable lock wheels 18 to respectively displace outwards relative to the bottom bracket 6 to further carry the locking holes 32 to respectively engage with the stub rods 11 of the alternative wheels 15. Therefore, when the cranks 1 are driven to move by foot pedals, the movable lock wheels 18 and the alternative wheels 15 are respectively attached together. Because of the effect of the auxiliary chain wheels 24 and the chain lines 25, once the crank 1 at one side is stepped on, the crank 1 at the opposite side is forced to lift. Therefore, the two cranks 1 can be driven by foot pedals to alternatively move back and forth.

When the control levers 31 are respectively adjusted to position (3), the two control cranks 26 are respectively forced by the two helical springs 29 to incline inwards, causing the two movable lock wheels 18 to move toward the fixed lock wheel 10 and the chain wheel holder 9 respectively (the movable lock wheels are respectively disengaged from the alternative wheels) to further carry the locking holes 32 to respectively engage with the stub rods 11 of the fixed lock wheel 10 or the chain wheel holder 9. Under this condition, the two cranks 1 are respectively coupled to the bottom bracket 6 in 180×angle relative to each other and driven by foot pedals to rotate in the same direction (in function as the two cranks of a conventional bicycle or stationary bicycle).

When the control levers 31 are respectively adjusted to position (2), the two movable lock wheels 18 are respectively moved to dispose between the alternative wheels 15 and the fixed lock wheel 10 or the chain wheel holder 9. Under this condition, the cranks 1 are respectively released from the constraint of the alternative wheels 15, the fixed lock wheel 10 and the chain wheel holder 9 for free rotation and permitted to be independently operated through reciprocating lever motion or circular crank motion. Before stepping, the toe-strap 33 on each foot pedal of each crank 1 is fastened on the foot. Because of the effect of the clutch bearing 2 in each crank 1, the chain wheel 4 is rotated in one direction to carry the free wheel of the bicycle to rotate forwards. While stepping on the foot pedals, several changes in operation can be made. Some examples are outlined hereinafter:

1. The two cranks are set at the same angle and simultaneously rotated to perform circular crank motion synchronously;
2. The two cranks are synchronously stepped to move up and down through reciprocating lever motion;
3. The two cranks are alternatively rotated to perform circular crank motion separately;
4. The two cranks are alternatively stepped to perform reciprocating lever motion separately; and
5. The crank at one side is driven to perform circular crank motion or reciprocating lever motion while the crank at the opposite side is kept standing still.

What is claimed is:

1. A power transmission mechanism for bicycles of the type having a bottom bracket bearing axle fastened in a bottom bracket and driven by two cranks to drive a chain wheel to carry a free-wheel to rotate via a bushed chain, the improvement comprising:

a chain wheel holder on said bottom bracket bearing axle at one end and incorporated in said chain wheel;

a fixed lock wheel on said bottom bracket bearing axle at an opposite end;

two clutch bearings respectively mounted on said bottom bracket bearing axles at two opposite ends between said two cranks;

two alternative wheels and two movable lock wheels respectively mounted on said cranks above said bottom bracket bearing axle, said alternative wheels being able to freely rotate on said cranks;

steel balls set between said movable lock wheels and said cranks to prohibit said movable lock wheels from rotary motion permitting said movable lock wheels to be respectively moved horizontally to couple with said alternative wheels, said fixed lock wheel or said chain wheel holder;

a reciprocating lever motion mechanism comprising an auxiliary bracket connected to said bottom bracket at the bottom, an auxiliary axle rotatable fastened in said auxiliary bracket, two auxiliary chain wheels respectively mounted on said auxiliary axle at two opposite ends, two chain lines respectively mounted between said auxiliary chain wheels and said alternative wheels, spaced from and crossed over each other, permitting said alternative wheels to be driven to rotate in direction against each other;

a control mechanism comprising two control crank brackets above said auxiliary bracket, two control crank-arms having each an end secured to said control crank brackets and an opposite end attached to said movable lock wheels, two double helical springs having each two opposite ends respectively stopped against said control crank-arms and said control crank brackets, two control levers respectively connected to said control crank-arms by a steel wire each to drive said movable lock wheels to displace transversely; and wherein said control levers can be respectively adjusted to drive said movable lock wheels to respectively couple with or disengage from said alternative wheels, said fixed lock wheel or said chain wheel holder, permitting said two cranks to be driven to perform reciprocating lever motion or circular crank motion alternatively or synchronously.

* * * * *